United States Patent
Kim et al.

(10) Patent No.: US 10,450,460 B2
(45) Date of Patent: Oct. 22, 2019

(54) THERMOPLASTIC RESIN COMPOSITION AND MOLDED ARTICLE PRODUCED THEREFROM

(71) Applicant: LOTTE ADVANCED MATERIALS CO., LTD., Yeosu-si (KR)

(72) Inventors: Kyung Rae Kim, Uiwang-si (KR); Chan Gyun Shin, Uiwang-si (KR); Hyoung Taek Kang, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 51 days.

(21) Appl. No.: 15/754,774

(22) PCT Filed: Aug. 25, 2016

(86) PCT No.: PCT/KR2016/009412
§ 371 (c)(1),
(2) Date: Feb. 23, 2018

(87) PCT Pub. No.: WO2017/039224
PCT Pub. Date: Mar. 9, 2017

(65) Prior Publication Data
US 2018/0244917 A1   Aug. 30, 2018

(30) Foreign Application Priority Data
Aug. 28, 2015   (KR) .................. 10-2015-0122087

(51) Int. Cl.
| | |
|---|---|
| *C08L 77/06* | (2006.01) |
| *C08J 5/00* | (2006.01) |
| *C08K 5/098* | (2006.01) |
| *C08L 77/02* | (2006.01) |
| *C08L 77/10* | (2006.01) |

(52) U.S. Cl.
CPC ............ *C08L 77/06* (2013.01); *C08J 5/00* (2013.01); *C08K 5/098* (2013.01); *C08L 77/02* (2013.01); *C08L 77/10* (2013.01); C08L 2201/08 (2013.01); C08L 2205/02 (2013.01); C08L 2205/06 (2013.01)

(58) Field of Classification Search
CPC .......... C08L 77/06; C08L 77/02; C08L 77/10; C08L 2201/08; C08L 2205/02; C08L 2205/06; C08L 23/0815; C08J 5/00; C08K 5/098; C08K 7/14; C08K 2003/265
USPC ....................................... 524/538
See application file for complete search history.

(56) References Cited

U.S. PATENT DOCUMENTS

| | | | |
|---|---|---|---|
| 2012/0157606 A1 | 6/2012 | Lee et al. | |
| 2012/0196961 A1 | 8/2012 | Toshikazu et al. | |
| 2012/0196962 A1* | 8/2012 | Kobayashi | C08K 3/26 524/204 |
| 2013/0338260 A1 | 12/2013 | Center et al. | |
| 2016/0177093 A1 | 6/2016 | Kang et al. | |

FOREIGN PATENT DOCUMENTS

| | | |
|---|---|---|
| EP | 3034558 A1 | 6/2016 |
| JP | 05-043798 A | 2/1993 |
| KR | 10-0113797 | 12/1996 |
| KR | 10-2012-0089912 A | 8/2012 |
| WO | 2012/106319 A2 | 8/2012 |
| WO | 2013/188488 A1 | 12/2013 |
| WO | 2015/011001 A1 | 1/2015 |
| WO | 2017/039224 A1 | 3/2017 |

OTHER PUBLICATIONS

International Search Report in counterpart International Application No. PCT/KR2016/009412 dated Nov. 4, 2016, pp. 1-4.

* cited by examiner

*Primary Examiner* — William K Cheung
(74) *Attorney, Agent, or Firm* — Additon, Higgins & Pendleton, P.A.

(57) ABSTRACT

A thermoplastic resin composition of the present invention comprises: (A) an aromatic polyamide resin; (B) an aliphatic polyamide resin; (C) a first chelating agent comprising at least one of a carboxylic acid and a salt thereof, and an amino group; (D) a second chelating agent comprising an aromatic dicarboxylic acid; and (E) a filler. The thermoplastic resin composition has an excellent long-term heat stability, and thus has an advantage of maintaining mechanical properties even when exposed to high temperatures for a long period of time.

15 Claims, No Drawings

THERMOPLASTIC RESIN COMPOSITION AND MOLDED ARTICLE PRODUCED THEREFROM

CROSS-REFERENCE TO RELATED APPLICATIONS

This application claims priority to and the benefit of International Application No. PCT/KR2016/009412, filed Aug. 25, 2016, which published as WO 2017/039224 on Mar. 9, 2017; and Korean Patent Application No. 10-2015-0122087, filed in the Korean Intellectual Property Office on Aug. 28, 2015, the entire disclosure of each of which is incorporated herein by reference.

TECHNICAL FIELD

The present invention relates to a thermoplastic resin composition and a molded article formed of the same. More particularly, the present invention relates to a polyamide-based thermoplastic resin composition having high long-term heat stability and a molded article formed of the same.

BACKGROUND ART

Polyamide resins are used in a wide range of fields such as electric parts, electronic parts, and automobile parts due to excellent properties thereof in terms of heat resistance, abrasion resistance, chemical resistance and flame retardancy.

Particularly, in the automobile industry, metal parts are being replaced by plastic parts in order to achieve weight reduction. In particular, peripheral parts of an engine compartment (i.e., under-the-hood components) are exposed to a high temperature environment for a long time and thus are manufactured using polyamide resin compositions having excellent heat resistance.

As smaller engines are becoming more popular in the automobile industry, the number of automobiles employing a turbocharger is increasing to reduce fuel consumption. In an automobile employing a turbocharger, the temperature in the engine compartment rises greatly due to high output power. Thus, there has been a need to use a material having a higher level of heat resistance for parts in the engine compartment such that the parts can withstand a high temperature environment for a long time.

Generally, organic antioxidants such as phenol or phosphite-based antioxidants are widely used in order to secure high long-term heat stability of a polyamide resin composition. However, there is a limitation in maintaining excellent physical properties at high temperatures over a long period of time.

Copper halide heat stabilizers, such as a CuI/KI mixture, which is known to have excellent long-term heat stability at high temperature as compared with organic antioxidants, have been used. However, copper is likely to discolor or precipitate over time, causing problems when used in electrical, electronic and automotive parts.

Therefore, there is a need for a polyamide resin composition which can retain high heat stability even when exposed to high temperature for a long time so as to be used for peripheral components of an engine compartment of an automobile.

The background technique of the present invention is disclosed in Korean Patent No. 10-0113797.

DISCLOSURE

Technical Problem

It is an aspect of the prevent invention to provide a thermoplastic resin composition which has good properties in terms of long-term heat stability and processability and thus can retain mechanical strength for a long period of time.

These and other objects of the present invention can be achieved by the following embodiments described below.

Technical Solution

One aspect of the present invention relates to a thermoplastic resin composition. The thermoplastic resin composition includes: (A) an aromatic polyamide resin; (B) an aliphatic polyamide resin; (C) a first chelating agent including an amino group and at least one of carboxylic acid and a salt thereof; (D) a second chelating agent including an aromatic dicarboxylic acid; and (E) fillers.

In exemplary embodiments, the thermoplastic resin composition may include: about 30 wt % to about 70 wt % of the aromatic polyamide resin (A); about 1 wt % to about 20 wt % of the aliphatic polyamide resin (B); about 0.1 wt % to about 1 wt % of the first chelating agent (C); about 0.1 wt % to about 5 wt % of the second chelating agent (D); and about 10 wt % to about 60 wt % of the fillers (E).

In exemplary embodiments, a weight ratio of the aromatic polyamide resin (A) to the aliphatic polyamide resin (B) may range from about 1:0.05 to about 1:0.5.

In exemplary embodiments, the fillers (E) may be glass fiber.

In exemplary embodiments, the aromatic polyamide resin (A) may contain: a dicarboxylic acid unit including about 10 mol % to about 100 mol % of an aromatic dicarboxylic acid unit; and a diamine unit including at least one of an aliphatic diamine unit and an alicyclic diamine unit.

In exemplary embodiments, the aromatic polyamide resin (A) may include at least one of a polyamide (PA6T/66) composed of hexamethylene terephthalamide and hexamethylene adipamide and a polyamide (PA6T/DT) composed of hexamethylene terephthalamide and 2-methylpentamethylene terephthalamide.

In exemplary embodiments, the aliphatic polyamide resin (B) may include at least one of polyamide 6 and polyamide 66.

In exemplary embodiments, the first chelating agent (C) may include at least one of ethylenediamine-N,N,N',N'-tetraacetic acid (EDTA), ethylene glycol bis(2-aminoethylether)-N,N,N',N'-tetraacetic acid (EGTA), trans-1,2-diaminocyclohexane-N,N,N',N'-tetraacetic acid (CyDTA), diethylene triamine pentaacetic acid (DTPA), triethylenetetraamine-N,N,N',N'',N''',N'''-hexaacetic acid (TETHA), N-(2-hydroxyethyl)ethylenediamine triacetic acid (HEDTA), and metal salts thereof.

In exemplary embodiments, the first chelating agent (C) may be a metal salt including at least one metal ion selected from sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), and zirconium (Zr) ions.

In exemplary embodiments, the aromatic dicarboxylic acid used as the second chelating agent (D) may include at least one of terephthalic acid and isophthalic acid.

In exemplary embodiments, terephthalic acid may be present in an amount of about 30 wt % to about 70 wt % based on the total weight of the aromatic polyamide resin (A), the aliphatic polyamide resin (B), the first chelating agent (C), and the second chelating agent (D).

Another aspect of the present invention relates to a molded article formed of the thermoplastic resin composition set forth above.

In exemplary embodiments, the molded article may have initial tensile strength of about 1,500 kg/cm² or higher, as measured in accordance with ASTM D638 and may satisfy Equation 1, where $a_0$ denotes initial tensile strength of the molded article and $a_1$ denotes tensile strength of the molded article, as measured after the molded article is left at about 220° C. for about 500 hours.

$$70 \le \frac{a_1}{a_0} \times 100 \le 105 \quad \text{[Equation 1]}$$

In exemplary embodiments, the molded article may be at least one of under-the-hood components.

The molded article may be a battery fuse, a turbo resonator, or an intercooler tank.

Advantageous Effects

The present invention provides a thermoplastic resin composition which can retain initial properties at high temperature for a long time.

In addition, the thermoplastic resin composition generates a small quantity of gas during processing thereof and thus can exhibit good processability and continuous workability.

It should be understood that the present invention is not limited to the aforementioned effects and other effects can be clearly understood by those skilled in the art from the appended claims.

BEST MODE

Hereinafter, embodiments of the present invention will be described in detail.

A thermoplastic resin composition according to the present invention includes: a polyamide resin including (A) an aromatic polyamide resin and (B) an aliphatic polyamide resin; (C) a first chelating agent including an amino group and at least one of carboxylic acid and a salt thereof; (D) a second chelating agent including an aromatic dicarboxylic acid; and (E) fillers.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Herein, "first chelating agent" and "second chelating agent" are used to refer to different types of chelating agents and are not to be construed in any way as limiting the present invention.

Polyamide Resin

The thermoplastic resin composition according to the present invention includes both the aromatic polyamide resin (A) and the aliphatic polyamide resin (B) as the polyamide resin, thereby exhibiting improved properties in terms of both long-term heat stability and processability.

(A) Aromatic Polyamide Resin

The aromatic polyamide resin (A) according to the present invention may be a homopolymer, copolymer, ternary copolymer or higher order polymer formed of an aromatic group-containing monomer, and, the term "copolymer", as used herein, refers to a polyamide having two or more amide and/or diamide repeat units.

Specifically, the aromatic polyamide resin has a structure in which an aromatic compound is contained in a main chain and may be obtained by polycondensation of a dicarboxylic acid monomer containing 10 mol % to 100 mol % of an aromatic dicarboxylic acid with a diamine monomer including aliphatic diamine and/or alicyclic diamine. For example, the aliphatic diamine and/or the alicyclic diamine may have 4 to 20 carbon atoms, and the aromatic dicarboxylic acid contains an aromatic benzene ring and may be terephthalic acid, isophthalic acid, or a combination thereof.

In other words, the aromatic polyamide resin may contain: a dicarboxylic acid unit including about 10 mol % to about 100 mol % of an aromatic dicarboxylic acid unit; and a diamine unit including at least one of an aliphatic diamine unit and an alicyclic diamine unit, as a repeat unit.

In one embodiment, the aromatic dicarboxylic acid unit may be derived from terephthalic acid, isophthalic acid, 2,6-naphthalenedicarboxylic acid, 2,7-naphthalenedicarboxylic acid, 1,4-naphthalenedicarboxylic acid, 1,4-phenylenedioxyphenylene acid, 1,3-phenylenedioxydiacetic acid, diphenic acid, 4,4'-oxybis(benzoic acid), diphenylmethane-4,4'-dicarboxylic acid, diphenylsulfone-4,4'-dicarboxylic acid, 4,4'-biphenyldicarboxylic acid, and combinations thereof.

In one embodiment, the dicarboxylic acid unit may further include a unit derived from a non-aromatic dicarboxylic acid, in addition to the aromatic dicarboxylic acid unit. The non-aromatic dicarboxylic acid may include aliphatic and/or alicyclic dicarboxylic acids. For example, the non-aromatic dicarboxylic acid unit may be derived from: aliphatic dicarboxylic acids such as malonic acid, dimethyl malonic acid, succinic acid, glutaric acid, adipic acid, 2-methyladipic acid, trimethyladipic acid, pimelic acid, 2,2-dimethylglutaric acid, 2,2-diethyl succinic acid, azelaic acid, sebacic acid, and suberic acid; alicyclic dicarboxylic acids such as 1,3-cyclopentane dicarboxylic acid and 1,4-cyclohexane dicarboxylic acid; and combinations thereof.

In one embodiment, the non-aromatic dicarboxylic acid unit may be present in an amount of about 90 mol % or less, for example, 80 mol % or less, specifically 70 mol % or less, more specifically 60 mol % or less, based on the total mole number of the dicarboxylic acid unit.

In one embodiment, the diamine unit may be derived from aliphatic and/or alicyclic diamines. Examples of the aliphatic and/or alicyclic diamines may include tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, 1,12-diaminododecane, and combinations thereof.

In one embodiment, the aromatic polyamide resin may include a polyamide (PA6T/66) composed of hexamethylene terephthalamide and hexamethylene adipamide, polyamide (PA6T/DT) composed of hexamethylene terephthalamide and 2-methylpentamethylene terephthalamide, or a combination thereof. For example, the aromatic polyamide resin may be PA6T/66.

In one embodiment, the aromatic polyamide resin may have a glass transition temperature (Tg) of about 80° C. to about 150° C., for example, about 85° C. to about 120° C. Within this range, the aromatic polyamide resin can provide high heat resistance.

In one embodiment, the molecular weight of the aromatic polyamide resin is not particularly limited, and the aromatic polyamide resin may have an intrinsic viscosity (IV) of about 0.75 dL/g or higher, for example, about 0.75 dL/g to about 1.15 dL/g, as measured using an UBBELOHDE viscometer in a sulfuric acid solution at 25° C.

In one embodiment, the aromatic polyamide resin may be present in an amount of about 30 wt % to about 70 wt %, for example, about 40 wt % to about 60 wt %, based on the total weight of the thermoplastic resin composition ((A)+(B)+(C)+(D)+(E)). Within this range, the thermoplastic resin composition can have good properties in terms of long-term heat stability, heat resistance, and mechanical strength.

(B) Aliphatic Polyamide Resin

The aliphatic polyamide resin (B) according to the present invention is a polyamide having no aromatic ring in a molecular chain and may contain a $C_{10}$ to $C_{20}$ aliphatic group.

In one embodiment, the aliphatic polyamide resin may be a homopolymer, copolymer, ternary copolymer, or higher order polymer formed from aminocarboxylic acid, lactam or diamine, and dicarboxylic acid. Here, the term "copolymer" refers to a polyamide having two or more amide and/or diamide repeat units.

In one embodiment, the aminocarboxylic acid may be a $C_6$ to $C_{12}$ aminocarboxylic acid and may include, for example, 6-aminocaproic acid, 7-aminoheptanoic acid, 9-aminononanoic acid, 11-aminoundecanoic acid, 12-aminododecanoic acid, and combinations thereof.

In one embodiment, the lactam may be a $C_4$ to $C_{12}$ lactam and may include, for example, α-pyrrolidone, ε-caprolactam, ω-laurolactam, ε-enantlactam, and combinations thereof.

In one embodiment, the diamine may be an aliphatic or alicyclic diamine and may include, for example, tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, 1,12-diaminododecane, and combinations thereof.

In one embodiment, the dicarboxylic acid may be an aliphatic and/or alicyclic dicarboxylic acid and may include, for example, adipic acid, 2-methyladipic acid, trimethyladipic acid, glutaric acid, 2,2-dimethylglutaric acid, pimelic acid, suberic acid, azelaic acid, sebacic acid, dodecanedioic acid, 1,4-cyclohexanedicarboxylic acid, malonic acid, dimethylmalonic acid, succinic acid, 2,2-diethylsuccinic acid, and combinations thereof.

In one embodiment, the aliphatic polyamide resin may include polyamide 6, polyamide 66, polyamide 46, polyamide 610, polyamide 612, polyamide 11, polyamide 12, polyamide 910, polyamide 912, polyamide 913, polyamide 914, polyamide 915, polyamide 616, polyamide 936, polyamide 1010, polyamide 1012, polyamide 1013, polyamide 1014, polyamide 1210, polyamide 1212, polyamide 1213, polyamide 1214, polyamide 614, polyamide 613, polyamide 615, polyamide 616, polyamide 613, and the like. These may be used alone or as a mixture thereof. For example, the aliphatic polyamide resin may be polyamide 6, polyamide 66, or a mixture thereof.

In one embodiment, the aliphatic polyamide resin may have a glass transition temperature (Tg) of about 30° C. to about 80° C., for example, about 35° C. to about 50° C., and a melting point of about 160° C. to about 210° C. Within this range, the thermoplastic resin composition can have good properties in terms of impact strength and processability.

In one embodiment, the aliphatic polyamide resin may have a number average molecular weight (Mn) of about 10,000 g/mol to about 200,000 g/mol, for example, about 20,000 g/mol to about 150,000 g/mol, without being limited thereto.

In one embodiment, the aliphatic polyamide resin may be present in an amount of about 1 wt % to about 20 wt %, for example, about 3 wt % to about 15 wt %, based on the total weight of the thermoplastic resin composition ((A)+(B)+(C)+(D)+(E)). Within this range, the thermoplastic resin composition can have good properties in terms of heat resistance, mechanical strength, and processability.

In one embodiment, the thermoplastic resin composition may include the aromatic polyamide resin and the aliphatic polyamide resin in a weight ratio of about 1:0.05 to about 1:0.5, for example, about 1:0.08 to about 1:0.2. Within this range of weight ratio, the thermoplastic resin composition can have further improved long-term heat stability and can have good processability during extrusion or the like due to reduction in gas generation.

Chelating Agent

The thermoplastic resin composition according to the present invention includes two types of chelating agents (the first chelating agent and the second chelating agent), wherein the chelating agents oxidize a surface of the resin composition and promote formation of char on the surface during aging at high temperature to prevent penetration of an oxide layer into the thermoplastic resin and thus decomposition of the thermoplastic resin, thereby improving long-term heat stability of the thermoplastic resin.

(C) First Chelating Agent

The first chelating agent (C) according to the present invention may include: at least one of carboxylic acid and a salt thereof; and an amino group. The first chelating agent is a compound containing a functional group capable of forming a bond with a metal ion and can be bonded to cations of a dissociated metal salt to form a stabilized chelate complex.

In one embodiment, the first chelating agent may be any one or a mixture of polyvalent carboxyl group-containing compounds. For example, the first chelating agent is polycarboxylic acid or a carboxylate group-containing compound, specifically a compound containing a functional group represented by Formula 1a, 1b, or 1c.

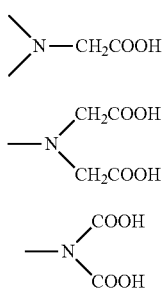

[Formula 1a]

[Formula 1b]

[Formula 1c]

Examples of the compound containing the functional group represented by Formula 1a, 1b, or 1c may include ethylenediamine-N,N,N',N'-tetraacetic acid (EDTA), ethylene glycol bis(2-aminoethylether)-N,N,N',N'-tetraacetic acid (EGTA), trans-1,2-diaminocyclohexane-N,N,N',N'-tetraacetic acid (CyDTA), diethylene triamine pentaacetic acid (DTPA), triethylenetetraamine-N,N,N',N'',N''',N'''-hexaacetic acid (TETHA), N-(2-hydroxyethyl)ethylenediamine triacetic acid (HEDTA), and metal salts thereof. These may be used alone or as a mixture thereof.

In the first chelating agent, the metal ion forming the bond may be at least one selected from among sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), and zirconium (Zr) ions. It should be understood that the present invention is not limited thereto and the metal ion may include any metal ion providing the aforementioned desired effects. For example, the first chelating agent may be ethylenediamine tetraacetic acid-disodium salt (EDTA-2Na).

In one embodiment, the first chelating agent may be present in an amount of about 0.1 wt % to about 1 wt %, for example, about 0.3 wt % to about 0.9 wt %, based on the total weight of the thermoplastic resin composition ((A)+(B)+(C)+(D)+(E)). Within this range, the thermoplastic resin composition can have good long-term heat stability and have good processability due to reduction in gas generation.

(D) Second Chelating Agent

The second chelating agent according to the present invention includes an aromatic dicarboxylic acid, wherein the aromatic dicarboxylic acid can considerably improve long-term heat stability of the thermoplastic resin composition when added to the resin composition. For example, the second chelating agent reacts with a sizing material of the fillers such as glass fiber together with the first chelating agent, thereby further improving long-term heat stability of the thermoplastic resin composition.

In one embodiment, the aromatic dicarboxylic acid may include phthalic acid, phthalic anhydride, terephthalic acid, isophthalic acid, naphthalene-2,6-dicarboxylic acid, and combinations thereof. Preferably, the aromatic dicarboxylic acid is terephthalic acid, isophthalic acid, or a combination thereof.

In one embodiment, the second chelating agent may be present in an amount of about 0.1 wt % to about 5 wt %, for example, about 0.3 wt % to about 1.2 wt %, based on the total weight of the thermoplastic resin composition ((A)+(B)+(C)+(D)+(E)). Within this range, the thermoplastic resin composition can have good long-term heat stability.

(E) Fillers

The fillers (E) according to the present invention serve to improve mechanical strength of the thermoplastic resin composition and can allow a desired level of mechanical strength of the thermoplastic resin composition to be secured through adjustment of the amount thereof. The fillers may include glass fiber.

The glass fiber may include any typical glass fibers known in the art and, for example, may have a diameter of about 8 µm to about 20 µm and a length of about 1.5 mm to about 8 mm. When the diameter of the glass fiber falls within this range, the glass fiber can provide high strength reinforcement, and, when the length of the glass fiber falls within this range, the resin composition can be easily introduced into a processing machine such as an extruder while having further improved mechanical strength.

In one embodiment, the glass fiber may be used in combination with other fibers such as carbon fibers, basalt fiber, fibers produced from biomass, and combinations thereof. Herein, "biomass" refers to a source of energy originating from plants or microorganisms.

In one embodiment, the glass fiber may have a circular shape, oval shape, rectangular shape, or dumbbell-like shape having two circles connected to each other, in cross-section.

In one embodiment, the glass fiber may have an aspect ratio of less than about 1.5 in cross-section and may be, for example, glass fiber having a circular shape and an aspect ratio of 1 in cross-section. Herein, the term "aspect ratio" is defined as a ratio of the longest diameter of the glass fiber to the smallest diameter of the glass fiber in cross-section. When the aspect ratio of the glass fiber falls within the aforementioned range, unit cost of products can be reduced and the thermoplastic resin composition can provide good properties in terms of dimensional stability and appearance.

In one embodiment, the glass fiber may be surface-treated with a sizing material in order to prevent reaction with a resin and improve a degree of impregnation. Here, the surface treatment may be performed during manufacture of the glass fiber or during post-processing.

In addition, the fillers can further improve long-term heat stability of the resin composition in cooperation with the second chelating agent.

By way of example, when glass fiber is used as the fillers, glass fiber filaments are preferably coated with a sizing material in order to protect the filaments from friction throughout the glass fiber fabrication process or to allow the glass fiber to be easily bonded to a resin.

The first chelating agent and the second chelating agent can react with the sizing material of the glass fiber, thereby improving long-term heat stability of the resin composition.

More specifically, the strength of the glass fiber depends upon the structure of a silicate network, and alkali oxides of the glass fiber are not easily incorporated into the silicate network, causing reduction in strength of the resin composition. According to the present invention, the first chelating agent and the second chelating agent combine with the sizing material of the glass fiber, thereby inhibiting action of the alkali oxides, such that the strength of the resin composition can be kept constant even when the resin composition is exposed to high temperature for a long time.

In one embodiment, the fillers may be present in an amount of about 10 wt % to about 60 wt %, for example, about 20 wt % to about 50 wt %, based on the total weight of the thermoplastic resin composition ((A)+(B)+(C)+(D)+(E)). Within this range, the thermoplastic resin composition can have good properties in terms of mechanical strength and long-term heat stability.

In one embodiment, the thermoplastic resin composition may further include an additive, as needed.

Examples of the additive may include a flame retardant, a lubricant, a plasticizer, a heat stabilizer, an antioxidant, a light stabilizer, a colorant, an antibacterial agent, a release agent, and an antistatic agent. These may be used alone or as a mixture thereof depending on desired properties of a molded article formed of the resin composition.

The flame retardant serves to reduce flammability of the resin composition and may include at least one of phosphate compounds, phosphite compounds, phosphonate compounds, polysiloxane, phosphazene compounds, phosphinate compounds, and melamine compounds, without being limited thereto.

The lubricant serves to lubricate a surface of metal contacting the thermoplastic resin composition during processing, molding, or extrusion to facilitate flow or movement of the resin composition and may include any typical lubricant known in the art.

The plasticizer serves to increase flexibility, workability, or extensibility of the thermoplastic resin composition and may include any typical plasticizer known in the art.

The heat stabilizer serves to inhibit thermal decomposition of the thermoplastic resin composition during kneading or molding at high temperature and may include any typical heat stabilizer known in the art.

The antioxidant serves to inhibit or block chemical reaction between the thermoplastic resin composition and oxygen to prevent the resin composition from decomposing and losing inherent physical properties and may include at least one of phenol, phosphite, thioether, and amine antioxidants, without being limited thereto.

The light stabilizer serves to inhibit or prevent UV-induced decomposition and thus discoloration or loss of mechanical properties of the thermoplastic resin composition and is preferably titanium oxide.

The colorant may include any typical pigment or dye known in the art.

In one embodiment, the additive may be present in an amount of about 1 part by weight to about 15 parts by weight relative to about 100 parts by weight of the thermoplastic resin composition ((A)+(B)+(C)+(D)+(E)).

The thermoplastic resin composition according to the present invention includes the two types of chelating agents and the two types of polyamide and thus can have good properties in terms of long-term heat stability and processability without deterioration in other properties of the polyamide resin, such as wear resistance, chemical resistance, flame retardancy, and mechanical strength.

In one embodiment, the thermoplastic resin composition may contain about 30 wt % to about 70 wt %, for example, about 40 wt % to about 65 wt %, specifically about 50 wt % to about 60 wt % of terephthalic acid based on the total weight of the aromatic polyamide resin (A), the aliphatic polyamide resin (B), the first chelating agent (C) and the second chelating agent (D) ((A)+(B)+(C)+(D)). Herein, the term "terephthalic acid component" refers to the terephthalic acid contained in the aromatic polyamide resin (A) and the second chelating agent (D). If the amount of the terephthalic acid component is outside the aforementioned range, the thermoplastic resin composition can have poor heat resistance retention and thus is likely to exhibit poor physical properties when exposed to high temperature for a long time.

In one embodiment, the thermoplastic resin composition according to the present invention may be prepared by any suitable method known in the art. For example, the aforementioned components and, optionally, other additives are mixed, followed by melt extrusion in an extruder, thereby preparing the thermoplastic resin composition in pellet form.

In accordance with another aspect of the present invention, a molded article may be formed of the thermoplastic resin composition set forth above. The molded article according to the present invention has good properties in terms of long-term heat stability and processability.

In one embodiment, the molded article may have initial tensile strength of about 1,500 kg/cm$^2$ or higher, as measured in accordance with ASTM D638 and may satisfy Equation 1, wherein $a_0$ denotes initial tensile strength of the molded article and $a_1$ denotes tensile strength of the molded article after storage at about 220° C. for about 500 hours.

$$70 \le \frac{a_1}{a_0} \times 100 \le 105 \quad \text{[Equation 1]}$$

In addition, the molded article may have a volatile matter satisfying Equation 2, as determined through a procedure in which 5 g of the molded article is weighed in a Petri dish, followed by covering the dish with a dish cap, and then the dish is placed on a hot plate at 330° C. for 2 hours, followed by measurement of the amount of volatile matter adsorbed on the dish cap:

$$50 \le \frac{c - c_0}{s} \times 10^6 \le 900 \quad \text{[Equation 2]}$$

wherein C is a final weight of the dish cap, $C_0$ denotes an initial weight of the dish cap, and S denotes a weight of the molded article).

The molded article is useful in fields requiring long-term heat stability and may be used as, for example, an under-the-hood component for automobile engines. In addition, the molded article may be a battery fuse, turbo resonator, or intercooler tank for automobiles.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:
(a) Aromatic polyamide resin
PA6T/66 (A6000, Solvay Advanced Polymers L.L.C.)
(b) Aliphatic polyamide resin
Polyamide 6 (TP 4208, Zig Sheng Industrial)
(c) First chelating agent
EDTA-2Na (Dow chemical)
(d) Second chelating agent
(d-1) Terephthalic acid (Samsung Petrochemical Co., Ltd.)
(d-2) Isophthalic acid (KP Chemical Corp.)
(e) Fillers
Glass fiber (983, Owens-Corning Inc., diameter: 4 μm, chop length: 10 mm, cross-sectional shape: circle)
(f) Heat stabilizer
A CuI/KI mixture (TP-H9008, Brueggemann Chemical)

Examples 1 to 4 and Comparative Examples 1 to 3

The aforementioned components were placed in amounts as listed in Table 1 in a mixer, followed by dry-mixing.

Then, the mixture was subjected to extrusion in a twin-screw extruder (L/D: 45, Φ: 44 mm), thereby preparing a thermoplastic resin composition in pellet form. The prepared pellets were subjected to injection molding using a 10 oz. injection machine at 330° C., thereby preparing a specimen for property evaluation.

In Table 1, the content of each component is expressed in % by weight.

TABLE 1

|  | Example | | | | Comparative Example | | |
|---|---|---|---|---|---|---|---|
|  | 1 | 2 | 3 | 4 | 1 | 2 | 3 |
| (a) | 58.5 | 58.5 | 59 | 59 | 63.8 | 63.8 | 59 |
| (b) | 5 | 5 | 5 | 5 | — | — | 5 |
| (c) | 0.5 | 0.5 | 0.5 | 0.5 | — | — | 1 |
| (d-1) | 1 | — | 0.5 | — | 1 | — | — |
| (d-2) | — | 1 | — | 0.5 | — | 1 | — |
| (e) | 35 | 35 | 35 | 35 | 35 | 35 | 35 |
| (f) | — | — | — | — | 0.2 | 0.2 | — |

Each of the thermoplastic resin compositions prepared in Examples 1 to 4 and Comparative Examples 1 to 3 was evaluated as to heat resistance retention and gas generation according to the following methods. Results are shown in Table 2.

Property Evaluation (1) Heat resistance retention rate: Some of the specimens prepared using each of the thermoplastic resin compositions of Examples 1 to 4 and Comparative Examples 1 to 3 were left at 23° C. and 50% RH for 48 hours, followed by measurement of initial tensile strength $a_0$ (unit: kg/cm$^2$) of the specimen in accordance with ASTM D638. Here, the initial tensile strength was measured at a tensile rate of 5 mm/min. Then, the rest of the specimens were left at 220° C. for 500 hours, followed by measurement of tensile strength $a_1$ (unit: kg/cm$^2$) of the specimen. A heat resistance retention rate (unit: %) was calculated according to Equation 3:

$$\frac{a_1}{a_0} \times 100 (\%) \quad \text{[Equation 3]}$$

(2) Gas generation: 5 g of a pellet specimen prepared using each of the thermoplastic resin compositions of Examples 1 to 4 and Comparative Examples 1 to 3 was weighed in a Petri dish, followed by covering the petri dish with a dish cap, placing the petri dish on a hot plate at 330° C. for 2 hours, and measurement of the amount of volatile matter adsorbed on the dish cap. A gas generation amount (unit: ppm) was calculated according to Equation 4:

$$\frac{C - C_0}{S} \times 10^6 \text{ (ppm)} \quad \text{[Equation 4]}$$

wherein C is a final weight of the dish cap, $C_0$ denotes an initial weight of the dish cap, and S denotes a weight of the pellet specimen.

TABLE 2

|  |  | Example | | | | Comparative Example | | |
|---|---|---|---|---|---|---|---|---|
|  |  | 1 | 2 | 3 | 4 | 1 | 2 | 3 |
| Long-term heat resistance | Initial tensile strength | 1697 | 1524 | 1720 | 1715 | 1686 | 1744 | 1702 |
|  | Tensile strength after 500 hours | 1563 | 1550 | 1640 | 1680 | 978 | 1047 | 1020 |
|  | Heat resistance retention rate | 92 | 102 | 95 | 97 | 58 | 60 | 59 |
| Gas generation | ppm | 720 | 610 | 530 | 540 | 940 | 830 | 750 |

As shown in Tables 1 and 2, it can be seen that the thermoplastic resin compositions of Examples 1 to 4 had a tensile strength of 1,500 kg/cm$^2$ or higher, as measured after storage at 220° C. for 500 hours and thus had high commercial applicability. In addition, the thermoplastic resin compositions had good long-term heat resistance and good processability due to reduction in gas generation.

Conversely, the thermoplastic resin compositions of Comparative Examples 1 and 2, prepared using a typical heat stabilizer, i.e., a copper halide compound, had lower long-term heat resistance than the thermoplastic resin compositions of Examples according to the present invention and generated a large quantity of gas, thereby exhibiting poor processability. In addition, the thermoplastic resin compositions of Comparative Examples 1 and 2 in which only the aromatic polyamide resin was used as a polyamide component had a lower tensile strength retention rate than the thermoplastic resin compositions of Examples. Therefore, it can be seen that the thermoplastic resin composition according to the present invention, which includes the two types of polyamide in specific amounts, can have high tensile strength even when exposed to high temperature for a long time.

Further, the thermoplastic resin composition of Comparative Example 3, which was free from the chelating agent including an aromatic dicarboxylic acid, had a much lower tensile strength (i.e., long-term heat resistance), as measured after storage at 220° C. for 500 hours than the thermoplastic resin composition of Examples according to the present invention.

Although the present invention has been described with reference to some embodiments in conjunction with the accompanying drawings, it should be understood that the foregoing embodiments are provided for illustration only and are not to be in any way construed as limiting the present invention, and that various modifications, changes, alterations, and equivalent embodiments can be made by those skilled in the art without departing from the spirit and scope of the invention.

The invention claimed is:

1. A thermoplastic resin composition comprising:
   (A) an aromatic polyamide resin;
   (B) an aliphatic polyamide resin;
   (C) a first chelating agent comprising an amino group and at least one of carboxylic acid and a salt thereof;
   (D) a second chelating agent comprising an aromatic dicarboxylic acid; and
   (E) fillers.

2. The thermoplastic resin composition according to claim 1, comprising: about 30 wt % to about 70 wt % of the aromatic polyamide resin (A); about 1 wt % to about 20 wt % of the aliphatic polyamide resin (B); about 0.1 wt % to about 1 wt % of the first chelating agent (C); about 0.1 wt % to about 5 wt % of the second chelating agent (D); and about 10 wt % to about 60 wt % of the fillers (E).

3. The thermoplastic resin composition according to claim 1, wherein a weight ratio of the aromatic polyamide resin (A) to the aliphatic polyamide resin (B) ranges from about 1:0.05 to about 1:0.5.

4. The thermoplastic resin composition according to claim 1, wherein the fillers (E) comprise glass fiber.

5. The thermoplastic resin composition according to claim 1, wherein the aromatic polyamide resin (A) contains: a dicarboxylic acid unit comprising about 10 mol % to about 100 mol % of an aromatic dicarboxylic acid unit; and a diamine unit comprising at least one of an aliphatic diamine unit and an alicyclic diamine unit.

6. The thermoplastic resin composition according to claim 1, wherein the aromatic polyamide resin (A) comprises at least one of a polyamide (PA6T/66) composed of hexamethylene terephthalamide and hexamethylene adipamide and a polyamide (PA6T/DT) composed of hexamethylene terephthalamide and 2-methylpentamethylene terephthalamide.

7. The thermoplastic resin composition according to claim 1, wherein the aliphatic polyamide resin (B) comprises at least one of polyamide 6 and polyamide 66.

8. The thermoplastic resin composition according to claim 1, wherein the first chelating agent (C) comprises at least one of ethylenediamine-N,N,N',N'-tetraacetic acid (EDTA), ethylene glycol bis(2-aminoethylether)-N,N,N',N'-tetraacetic acid (EGTA), trans-1,2-diaminocyclohexane-N,N,N',N'-tetraacetic acid (CyDTA), diethylene triamine pentaacetic acid (DTPA), triethylenetetraamine-N,N,N',N'',N''',N'''-hexaacetic acid (TETHA), N-(2-hydroxyethyl)ethylenediamine triacetic acid (HEDTA), and metal salts thereof.

9. The thermoplastic resin composition according to claim 1, wherein the first chelating agent (C) is a metal salt comprising at least one metal ion selected from sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), and zirconium (Zr) ions.

10. The thermoplastic resin composition according to claim 1, wherein the aromatic dicarboxylic acid used as the second chelating agent (D) comprises at least one of terephthalic acid and isophthalic acid.

11. The thermoplastic resin composition according to claim 1, comprising terephthalic acid in an amount of about 30 wt % to about 70 wt % based on the total weight of the aromatic polyamide resin (A), the aliphatic polyamide resin (B), the first chelating agent (C), and the second chelating agent (D).

12. A molded article formed of the thermoplastic resin composition according to claim 1.

13. The molded article according to claim 12, wherein the molded article has initial tensile strength of about 1,500 kg/cm$^2$ or higher, as measured in accordance with ASTM D638 and satisfies Equation 1, where $a_0$ denotes initial tensile strength of the molded article and $a_1$ denotes tensile strength of the molded article, as measured after the molded article is left at about 220° C. for about 500 hours $$70 \leq \frac{a_1}{a_0} \times 100 \leq 105 \qquad \text{[Equation 1]}$$

14. The molded article according to claim 12, wherein the molded article is at least one of under-the-hood components.

15. The molded article according to claim 12, wherein the molded article is at least one of a battery fuse, a turbo resonator, and/or an intercooler tank.

* * * * *